United States Patent
Melcher et al.

(10) Patent No.: US 6,175,207 B1
(45) Date of Patent: Jan. 16, 2001

(54) POWER UP COMMUNICATION INTERFACE SYSTEM

(75) Inventors: Amy L. Melcher, Minneapolis; Richard W. Simons, Golden Valley, both of MN (US); Henry E. Troost, IV, River Falls, WI (US); Edward L. Schwarz, Minneapolis, MN (US)

(73) Assignee: Honeywell International Inc., Morristown, NJ (US)

( * ) Notice: Under 35 U.S.C. 154(b), the term of this patent shall be extended for 0 days.

(21) Appl. No.: 09/363,624

(22) Filed: Jul. 29, 1999

(51) Int. Cl.[7] .............................. G08B 23/00; G05B 1/06
(52) U.S. Cl. .......................... 318/661; 318/650; 340/517; 340/500; 340/525; 236/15 BR; 236/15 C
(58) Field of Search ...................................... 318/560–696, 318/450–499; 324/83 A, DIG. 1, 252; 236/15 BR, 15 C, 15 B; 431/12, 13, 78; 340/517, 500, 501, 525, 520, 461, 521, 526

(56) References Cited

U.S. PATENT DOCUMENTS

| | | |
|---|---|---|
| 4,145,179 | 3/1979 | Tanaka et al. . |
| 4,447,781 * | 5/1984 | van Dyke ............................ 324/83 A |
| 5,249,739 * | 10/1993 | Bartels et al. .................... 236/15 BR |
| 5,307,050 * | 4/1994 | Patton et al. ........................... 340/517 |
| 5,329,273 * | 7/1994 | Patton ................................... 340/517 |
| 5,549,469 | 8/1996 | Wild et al. . |

* cited by examiner

Primary Examiner—Paul Ip
(74) Attorney, Agent, or Firm—Charles L. Rubow

(57) ABSTRACT

A controller for a system has two or more operating modes. The controller operates according to a different control algorithm in each operating mode. A manually operable switch typically used for sending a reset signal to the controller, may also be used to change operating modes. The controller changes operating mode when it detects that the switch is manually operated during a preselected phase of controller operation, typically when power is first applied. The disclosed embodiment allows up to four different operating modes to be selected. A first selection of operating modes can occurs if the switch is held closed during startup and then immediately released. A second selection of operating mode occurs if the switch is pressed within a preselected time interval after power is first applied to the controller. Both selections can be made during a single start-up event. The controller may use a status light if present, to visually indicate what operating mode has been selected after the time intervals in which to change operating modes have elapsed.

15 Claims, 2 Drawing Sheets

POWER UP COMMUNICATION INTERFACE SYSTEM

BACKGROUND OF THE INVENTION

Many different types of systems and devices rely on a controller of some type to control their operation. Such systems have a number of individual functions which must occur in some predetermined order for the system to operate properly. These functions are performed in a sequence of two or more phases or cycles under the control of the controller. For example, consider the common example of a washing machine. There is an initial fill cycle followed by an agitation cycle. Then there is a drain cycle, a spin cycle to extract soapy water, and at least one rinse cycle which may be combined with a spin cycle where rinse water is sprayed into the tub while the tub is spinning. Then there is a final spin cycle which dries the clothes to the maximum extent possible. The controller is necessary to sequence and time the individual phases of a complete wash cycle. We will call a specified set of these functions to be executed in a specified sequence for a particular device an operating mode.

In many cases there are two or more versions of such a device which are distinguishable from each other by among other things, their operating modes. The versions share many similarities in their operating modes or states, but also have important differences in their operating modes. These differences require different controller operation, that is, different operating modes. Turning to the washing machine example again, manufacturers usually produce different versions of similar washing machines. Thus, different versions have different numbers of washing cycles and water temperature options, extra low and high speed cycles, etc. Each version requires a controller tailored to its specific feature set, that is a controller having the appropriate operating mode for the device. Thus, where a number of these different device versions exist, there must be a corresponding number of different controllers each having its own operating mode.

If this number of different controllers is large, a substantial stocking and inventory problem for these controllers can arise. One example might be for a business handling replacement controllers for repairing the controlled devices. Another example is for large custom-designed systems where controllers must be specially configured for each installation. Large burner installations are an example of this situation.

Before the widespread availability of low cost microcontrollers these controllers were usually electro-mechanical devices of some type which provided the sequencing and timing for the various functions. With these older devices, it was customary to either provide a different controller for each operating mode, or to manually alter the configuration of the controller to suit the requirements of each system. But the need for a different controller for each operating mode of an otherwise very similar system, or a process for altering a single controller unit to provide a number of different operating modes, resulted in a complicated controller inventory and configuration process during installation and perhaps even more so, for maintaining a suitable spares inventory.

With the use of microcontrollers, the function and selection of a number of various operating modes provided to the system by the controller can be implemented in a more powerful and flexible way. A single microcontroller and PROM (programmable read only memory) can provide a number of different operating modes for a particular system. A specific operating mode may involve a particular set of instruction sequences, a particular set of numerical parameters, or a combination of both. In one version of a system controller which can be configured to operate in a number of different operating modes, a different PROM can be provided for each operating mode. This reduces the cost if not the number of individual units which must be produced and stocked. In another version, the PROM can be configured individually by a computer when the system parameters are known. In yet another version, one or more selector switches on the controller housing can be manually set to different positions prior to installation, each switch configuration specifying a different operating mode. In this situation, the microcontroller senses the states of the selector switches and executes the operating mode designated by the selector switches. Each of these expedients has merit in some circumstances. While these expedients do provide the types of controllers needed, the necessity of manufacturing and stocking a number of differing controllers adds cost to them.

Since the operating modes often have many, or even most, functions in common, the various operating modes can usually share a number of individual instruction sequences. Where the operating modes are selected by selector switches, the selection and sequencing of individual instruction sequences for a particular operating mode is made to depend on the selector switch settings. The instructions provided for the microcontroller which operates in this manner include an executive routine to perform these selection and sequencing functions. The executive program references the selector switch settings in transferring instruction execution to individual instruction sequences. In other situations, the operating modes may differ only in the time spans or durations of particular functions or parameters. Each combination of various functions' durations define a different operating mode. There are a number of different programming techniques which can provide the values for these time spans.

This is in fact the case for the particular application for which this invention was made, which is for controlling oil-fired burner operation. Operation of different versions in a family of oil burners differs mainly in the times for each of the functions. For example, the versions may have differing durations for their ignition and flame stabilization phases and differing values for their flame failure response times.

Where there are a large number of operating modes, the use of mode selector switches is convenient. Three selector switches can theoretically allow as many as eight different operating modes to be designated. Where there are only a small number of operating modes, say two or three, the additional one or two switches add cost to the controller which we prefer to avoid if possible. In fact, space limitations on the circuit board or outer surface of the housing may make it difficult or impossible in some situations to provide the necessary number of switches, particularly to existing designs. Then too, the fact that these mode switches are present on the device makes it tempting for personnel unfamiliar with the controller operation to improperly change their settings, thereby interfering with proper operation. A non-obvious means of changing operating mode provides at least some protection against improper mode changes.

An analogous problem arises in reconfiguring personal computers. As those familiar with computers know, pressing the F1 (or some other) key during a certain point in the startup sequence and typically indicated on the display, allows the computer's configuration to be changed. This keystroke causes a configuration menu to come up on the screen. The operator enters appropriate keystrokes as suggested by the menu to change the computer's configuration.

BRIEF DESCRIPTION OF THE INVENTION

In response to these various concerns, we have developed an alternative mechanism which can be implemented within many types of controllers for selecting any one of several operating modes. This mechanism is particularly suitable for use in controllers for oil burner systems and furnaces, and other types of burners as well.

Electronic controllers for burner systems and many other types of operating systems as well typically have a push button or other momentary contact switch which performs a reset, clear, start, or other manually initiated function. Such a function might be for initializing or reactivating the controller after the controller has been locked out because a malfunction or other anomaly has been detected. This push button switch will hereafter be referred to as either the reset switch (although this switch may invoke a different function in some systems) or simply as the manually operable switch. In burner systems for example, detected malfunctions occur for a variety of reasons, often when a flame detector fails to detect flame while a fuel valve is open. Safety codes usually provide that such a condition requires human intervention after emergency shutdown to avoid a potentially hazardous situation. Pressing the reset switch reinitiates normal controller operation after the reason for the malfunction has been corrected.

Our alternative operation mode selection mechanism uses the reset switch in conjunction with a change in power level, typically the transition to power on, to select the operating mode for the controller. Since the reset switch is already available, using it for mode selection does not require any further mechanical or electrical modification of the controller. Instead, the power-up event is used to define a short window of time during which the reset button has a meaning different from its normal purpose.

Our invention is for use in an electrically powered controller of the type providing at least one control signal having a plurality of levels, for controlling a system. The controller has the capability to run in at least first and second distinct operating modes, and provides each control signal with levels at least in part depending on the operating mode. The controller assumes a particular operating mode responsive to the value of a mode select signal having at least first and second unique values respectively associated with the first and second operating modes. The controller has a power terminal at which electrical power voltage is received, and which can be manually interrupted in some way, typically by a power switch such as a thermostat or circuit breaker, or even by removing a connector plug.

To implement the invention for this controller, the manually operable or reset switch provides a switch signal upon switch operation. A power sensor receives the power voltage and provides a power change signal responsive to a predetermined change in power voltage level. Typically, the a change will be a detected transition of power voltage from subnormal to within the normal range. A resolver includes a logic element and receives the power change signal and the switch signal, and responsive to a predetermined relationship between the switch signal and the power change signal, issues a state setting signal. A memory element having at least first and second states provides the mode select signal with a value representative of the memory element state. The memory element state changes responsive to the state setting signal from the logic element. Thus, in one possible embodiment, if the manually operable switch is closed during the power change signal, the memory element state changes. In another embodiment, the power change signal can be extremely short, so that only when the manually operable switch is operated simultaneously with applying power does the memory element change state.

It is also possible to change the state of at least a second memory element by providing a delayed power change signal. If the switch is closed during the delayed power change signal then the second memory element value is changed.

DESCRIPTION OF THE PREFERRED EMBODIMENTS

Figure 1:
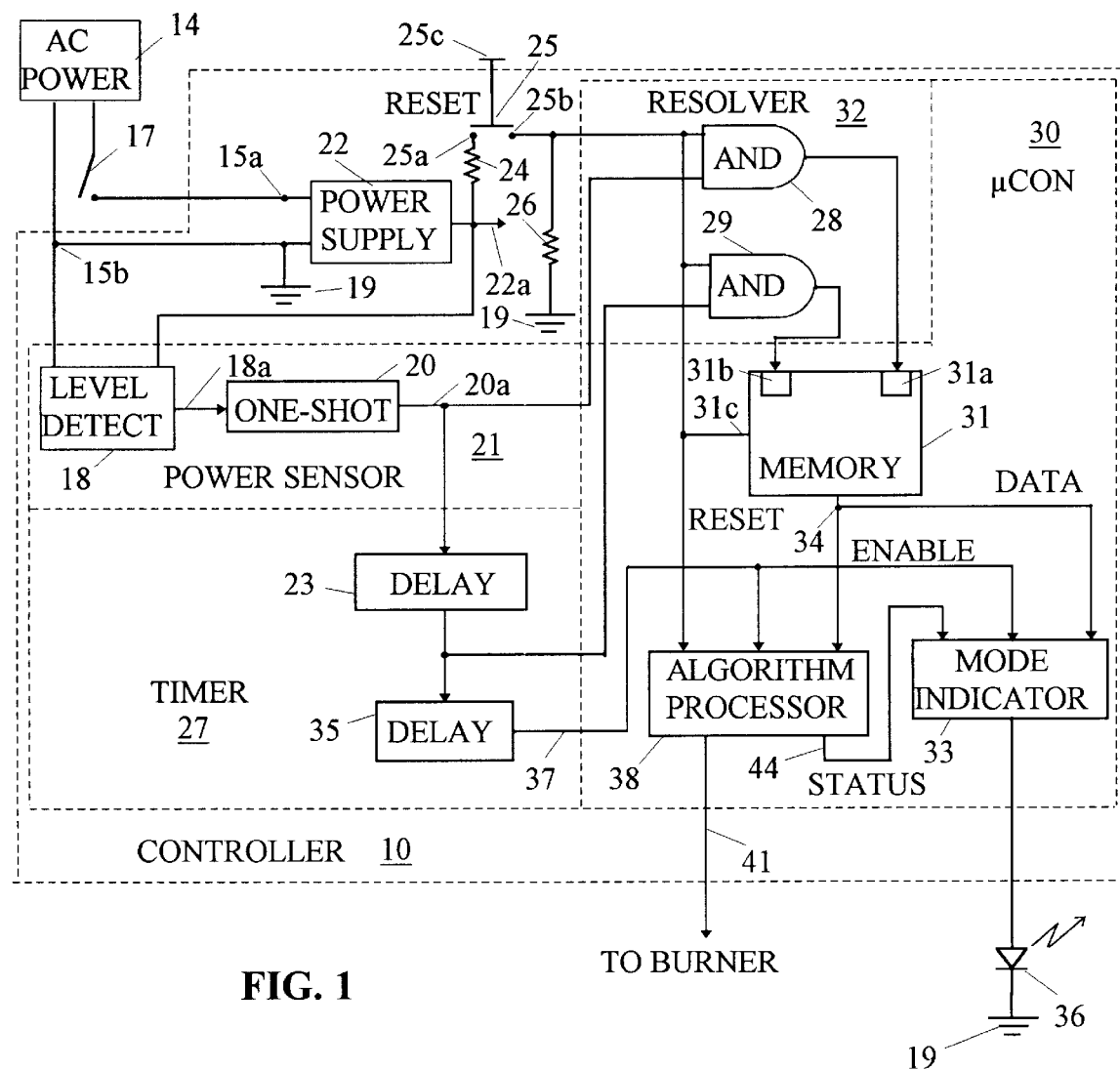
FIG. 1 is a logic level block diagram disclosing a preferred embodiment of the invention.

The block diagram of FIG. 1 discloses the various elements of a preferred embodiment for a communication interface tailored for use in a burner controller. However as mentioned above, the invention can be used with a variety of controllers for different operating systems. We are confident that those skilled in the art of designing operating system controllers will be able to easily incorporate the distinguishing features of the invention in other types of controllers.

Many of the components shown in FIG. 1 are logic elements, and all of these receive and/or produce logic level signals. Although it is theoretically possible to assign any voltage level to a logic value, we have arbitrarily chosen 0 v. to represent a logical 0 value, and a small positive DC value, say 3 or 5 v. to represent a logical 1. It is even possible to use current mode logic, where current levels represent the logic values. The point is simply that logic levels can be electrically represented or encoded in a variety of ways, and that this encoding scheme is irrelevant to the invention itself.

It is perhaps helpful at this point to discuss the structural aspects of the representation in FIG. 1. In its preferred embodiment, a microcontroller 30 and its supporting components such as an instruction memory (not shown) comprise the invention. However, this invention can also be implemented as individual discrete logic elements. We choose to disclose the structure of the invention in terms of these discrete logic elements which duplicate the functionality of microcontroller 30 in implementing the invention. That is, the individual logic elements shown are emulated by microcontroller 30 in the course of executing the instructions in the memory. Those familiar with modern microcontrollers such as microcontroller 30 know they can provide every logic circuit function which can alternatively be furnished using discrete logic elements. Data generated during execution of instructions implementing one logic element is stored temporarily in an operand memory and then becomes the inputs to another logic element at the time that logic element is implemented. When a logic circuit is implemented in a microcontroller, there are actual internal signals which precisely mimic the inputs and outputs of the logic circuit which the microcontroller becomes. Microcontroller 30 performs the same logic operation on the inputs that a discrete logic element would perform. Each of these individual logic elements which the microcontroller becomes, thus actually exists for a short period of time as microcontroller 30 assumes its function and identity. There is of course, no necessity for all of the elements of an invention to exist simultaneously in the preferred embodiment of the invention. But each of the elements shown in FIG. 1 does come into brief existence as the microcontroller 30 itself executes the instructions designed to perform the associated logic function.

Accordingly, it is possible to physically represent a preferred microcontroller embodiment of typical logic devices by the appropriate logic diagram because all of the individual elements physically come into existence within the microcontroller. Further, those familiar with microcontrollers and logic circuits can easily program a microcontroller to implement the device shown by a logic diagram such as that of FIG. 1 using nothing more than that diagram. That is, a simple logic circuit serves as a surrogate for a computer program flow chart. A logic diagram reduces the functionality of such an invention's components to its simplest terms. We believe that it is easier for those skilled in logic design arts to understand and practice an invention when presented in this way rather than as, say, source code for a microcontroller. Accordingly, we present the logic circuit of FIG. 1 as the most appropriate representation of one preferred embodiment for purposes of teaching the details of the invention to the public even though the actual commercial implementation is in software or firmware within microcontroller 30. We note in passing that there are many other preferred embodiments available for implementing the invention. Space in this disclosure is inadequate to allow all of these embodiments to be disclosed; indeed a disclosure presenting all of these embodiments would be at risk of challenge for prolixity. Nor does the patent law require us to present all of these embodiments in order for the claims following to encompass them.

Turning next to the actual structure of the particular preferred embodiment which we disclose, power terminals 15a and 15b are connected to receive AC power from a source 14 through a switch 17. In certain embodiments, switch 17 may be a thermostat or some other type of sensor-controlled switch. Alternatively, switch 17 may not be present, and its power-connecting function performed by some alternative means (a circuit breaker or fuse box switch are examples) of electrically connecting controller 10 to AC power terminals 15a and 15b. Or the act of installing controller 10 during which connector pins mate can be the power connecting event. Power terminal 15b is shown connected to a common or ground point 19. Power supply 22 provides the various DC level voltages required by the other elements of FIG. 1, chiefly microcontroller 30, on conductor 22a. The connections between power supply 22 and these other elements are not explicitly shown in FIG. 1 for the most part. A typical voltage at conductor 22a may be in the range of 3 to 6 v. with 5 v. being a very common value for small microcontrollers. One should note that there is a period of perhaps a second or two during which the power supply 22 output DC power voltages rise from essentially 0 v. to an operating or normal level. In large part this power up phase is due to the storage capacitor filter elements which remove ripple from the rectified AC power, and which require time to charge to the nominal DC voltage.

Figure 2:
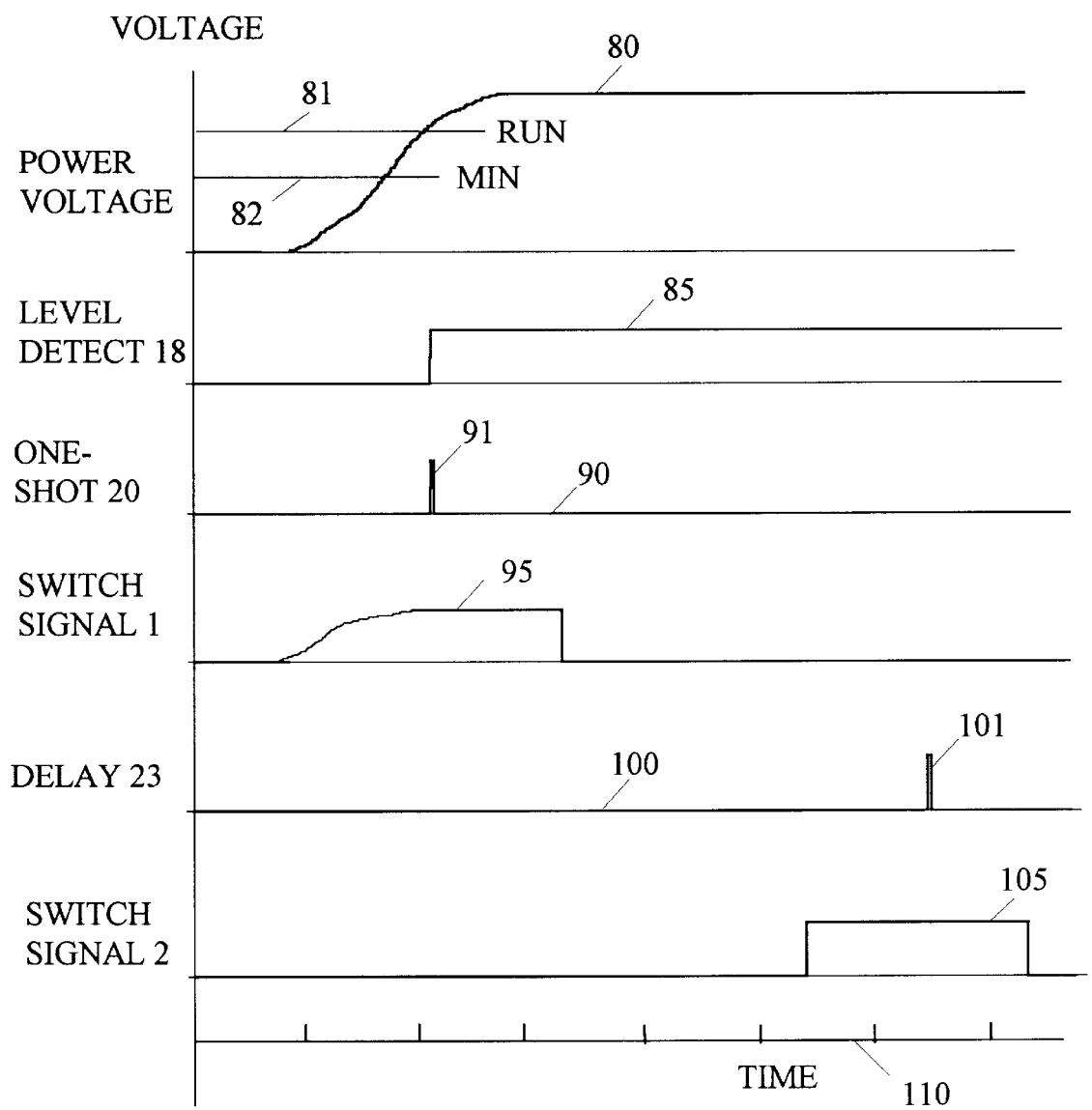
FIG. 2 shows waveforms associated with the operation of a controller built according to the embodiment shown in FIG. 1.

It is useful to refer to the waveforms of FIG. 2 when further describing the operation of the logic circuit shown in FIG. 1. A time scale 110 at the bottom shows individual time intervals, which may be interpreted as seconds in the present embodiment. In FIG. 2, waveform 80 represents the power voltage provided by power supply 22 on conductor 22a during the first few seconds following closing of switch 17. As AC power is first applied to power supply 22, DC power voltage comes up over a period of time while filter capacitors in power supply 22 charge, and waveform 80 reflects that. Voltage level 82 represents the minimum power voltage allowing error free microcontroller operation in emulating the logic elements of FIG. 1. When power voltage reaches level 81 then the elements of FIG. 1 begin normal operation.

A power sensor 21 comprises a level detect 18 and a one-shot 20. A one-shot circuit as used in this embodiment provides a logical 1 output pulse for a preselected time in response to a logical 0 to logical 1 transition in the input. Level detect 18 has signal terminals connected between the common voltage point 19 and the DC power supply voltage at conductor 22a. Level detect 18 may be internal to microcontroller 30, or may be a circuit such as an operational amplifier external to microcontroller 30. In either case, level detect 18 provides a logical 1 voltage level at its output terminal 18a when the voltage at conductor 22a is greater than that at level 81, and a logical 0 voltage level otherwise. The internal structure of level detect 18 is unimportant to the understanding of this invention. The level detect 18 output signal on terminal 18a is shown in FIG. 2 as waveform 85. One-shot 20 receives the level detect output and in response provides on path 20a as a power change signal, a pulse 91 forming a part of waveform 90 in FIG. 2.

It is possible to provide a "virtual" power sensor function within certain types of circuitry. This could be done for example, by designing the power sensor 21 to automatically produce its power change signal output pulse only after sufficient voltage is present to operate all of the other circuits elements such as delay 23 and AND gate 28. In the microcontroller embodiment, this might correspond to a master clock whose design or components require higher voltage to operate than the other elements of the microcontroller, and thus delays instruction processing until the operating voltage is sufficient for proper operation. Or the microcontroller might commence instruction execution with a short instruction loop which tests the level of the power voltage applied to the microcontroller and does not allow execution of other instructions until the software detects adequate power voltage.

At any rate, one-shot 20 receives the signal from level detect 18 and in response to the logical 0 to logical 1 transition therein shown in waveform 85 in FIG. 2, provides the power change signal on path 20a. A few microseconds is a convenient duration for this power change signal pulse. The power change signal is provided to a first input terminal of AND gate 28 and to the input of a delay element 23.

Delay elements 23 and 35 together comprise a timer element 27. The output of delay 23 is shown as waveform 100 in FIG. 2. Discrete delay elements suitable for use as delay elements 23 and 35 are readily available. However, in the microcontroller embodiment, it is easy to provide delay timing in software. Most microcontrollers have an internal clock whose value is stored and advanced in a clock register. The clock register can be accessed and read by the software. The software can simply record the current value of the clock register, and continuously test the changing value in the register until the specified delay time has elapsed.

AND gates 28 and 29 together form a resolver 32 which determines the closure status of a push button switch 25 suitable for providing the reset function for a burner controller. The functions of AND gates 28 and 29 can be easily duplicated by a microcontroller 30 executing appropriate instruction sets.

In this application, switch 25 is normally pressed to restart controller 10 operation after a lockout due to some detected operating fault. Such a lockout is designed to provoke human intervention to repair the fault condition, and after the repair is completed, then pressing switch 25 restarts controller 10 operation. Switch 25 includes two power terminals 25a and 25b and a movable contact 25c. Pressing contact 25c electrically connects terminals 25a and 25b. Switch terminal 25a is connected to power voltage conductor 22a through a current limiting resistor 24. A pull-down resistor 26 connects switch terminal 25b to ground 19. When switch 25 is closed resistors 24 and 26 are connected to form a voltage divider to provide a logical 1 voltage at terminal 25b. Terminal 25b is connected to a second input terminal of each AND gate 28 and 29, to an input of an algorithm processor 38, and to an enable input 31c of a memory element 31. Thus, closing switch 25 provides a logical 1 signal to each of these inputs. When switch 25 is not operated, resistor 26 pulls down the voltage at terminal 25b to 0 v. which is a logical 0. In FIG. 2, waveform 95 represents the voltage at terminal 25b when the push button 25c is depressed throughout the time while power is first applied and DC voltage on terminal 22a is rising. Switch 25 will not normally be a part of the microcontroller 30 in a microcontroller embodiment.

Timer 27 receives the power change signal from one-shot 20 at the input terminal of delay element 23. Delay 23 may have a fixed delay time of a few seconds, with 4–5 sec. being one suitable range of values. The function of delay 23 is to delay pulse 91 for the specified delay time, to thereby form pulse 101 in waveform 100. Pulse 101 from delay 23 comprises a timer signal. In FIG. 2, the delay time of delay 23 is represented as the time elapsing between the leading edges of pulses 91 and 101. The timer signal is provided to an input terminal of AND gate 29.

This particular design allows an operator to set or alter the values of two control bits 31a and 31b which are shown as forming a part of a memory 31. In the microcontroller embodiment of this invention shown, memory 31 is a part of the microcontroller 30 itself. We prefer memory 31 to be of the alterable or electrically programmable read-only memory (EPROM) type which holds the values to which control bits 31a and 31b are set whether memory 31 is receiving power or not, until the value of either is changed. It is important for memory 31 to hold the values to which control bits 31a and 31b are set so that opening switch 17 or other power outages will not require these values to be reset for proper operation of controller 10. The output signals from AND gate 28 and from AND gate 29 comprise state setting signals which are used to change the operating state of controller 10. The outputs of AND gates 28 and 29 are shown as applied to input terminals of control bits 31a and 31b which symbolizes direct control of these bits' values by the associated AND gates 28 and 29. Typical EPROM components will have some sort of addressing mechanism which associates a signal provided by AND gate 28 or 29 with its respective control bit 31a or 31b.

In the embodiment disclosed here, memory 31 further includes an enable terminal 31c which must receive a logical 1 when a value of a control bit is to be changed. It is possible to set the value of the control bit 31a or 31b equal to the logical value present in the AND gate 28 or 29 signal at the time a logical 1 is applied to enable terminal 31c. However, we prefer to toggle or simply change the binary value present in the control bit 31a or 31b responsive to a logical 1 signal provided both at the enable terminal 31c and to control bit 31a or 31b. As will be explained, this arrangement requires the affirmative act of closing switch 25 at a specified time in the power up sequence to change the value of a control bit 31a or 31b. Of course, in a microcontroller embodiment, it is a simple matter to write a value to an EPROM available to the microcontroller, by conditioning a change in the value recorded in the EPROM bit corresponding to control bit 31a or 31b, on a logical 1 value provided at switch terminal 25b detected within a time window corresponding to pulse 91 or 101. That is, after microcontroller 30 first receives power, microcontroller 30 samples the value at terminal 25b within the time interval defined by pulse 91 or 101, and alters the control bit 31a or 31b value when the value at terminal 25b at the time of sampling is a logical 1. In this embodiment, control bits 31a and 31b are assumed to have preset values when their controller 10 is first removed from the package. Then during installation the service person alters the control bit 31a and 31b values if necessary to conform to the system which the controller 10 will control.

To alter the value to which control bit 31a or 31b has been set, the operator closes switch 17 (or applies power to controller 10 in some other way) and in connection with this also presses the reset push button switch 25. This creates a predetermined relationship between the switch signal and the power change signal which resolver 32 detects. If switch 25 is closed during either or both of the first and second timer signal pulses 91 and 101, then the FIG. 1 apparatus causes control bits 31a and 31b respectively to change in value. As already mentioned, in this embodiment, reset switch 25 has been provided primarily to restart normal operation of microcontroller 30 after some abnormal condition has been detected which causes the controller 10 to enter a lockout mode which shuts down the burner system.

If an operator desires to change the value of control bit 31a, (s)he closes switch 25 while switch 17 is open and then closes switch 17. When power voltage crosses level 81, the level detect 18 output (waveform 85) changes from logical 0 to logical 1, causing one-shot 20 to provide the power change signal pulse 91. Since switch 25 is closed, both inputs to AND gate 28 are logical 1's, causing AND gate 28 to provide a logical 1 first state setting signal to control bit 31a. At the same time the switch signal at terminal 25b is present at the enable terminal 31c. The coincidence of the first state setting signal pulse 91 and the switch signal 95 causes the binary value stored in control bit 31a to change.

If an operator desires to change the value of control bit 31b only, (s)he closes switch 25 a few seconds after power is first applied to terminals 15a and 15b and after the output of the level detect signal 85 has changed from logical 0 to logical 1. Waveform 105 represents this change and is labeled as switch signal 2. If the delay interval of delay element 23 is say 5 sec., the operator might chose to wait about 3 sec. after closing switch 17 and then close switch 25 for at least 3 sec. more. When the delay of delay element 23 has elapsed, a timer signal pulse 101 issues. With switch 25 closed when pulse 101 occurs, now both inputs to AND gate 29 become logical 1's, causing AND gate 29 to provide a logical 1 second state setting signal pulse to control bit 31b. At the same time the switch signal at terminal 25b is present at the enable terminal 31c. The coincidence of the state setting signal pulse and the switch signal 105 causes the binary value stored in control bit 31b to change. It is entirely possible for the operator to hold switch 25 closed from the start of waveform 95 to the trailing edge of waveform 105, which will cause the values of both control bits 31a and 31b to change. After these operations, delay element 35 provides on path 37 the output of delay 23 delayed by a few tens or hundreds of microseconds, and which is used to initiate normal action by other elements of controller 10.

Memory element 31 provides the values of control bits 31a and 31b on path 34 to algorithm processor 38 as a mode select signal which specifies the operating state in which processor 38 is to perform. In the present embodiment memory element 31 can designate four different operating states accordingly as control bits 31a and 31b are each set to 0 or 1. Each of these operating states corresponds to a unique algorithm which algorithm processor 38 performs. Each algorithm may be implemented as a unique set of operating instructions for execution by algorithm processor 38, or may simply specify a different set of operating parameters for the same set of operating instructions. It is entirely possible to provide a means for selecting or altering the value of a third bit as well. In such a case, it may be necessary to indicate the start of each time interval during which switch 25 should be operated to effect such a change. This indication can be for example, a flash of light from an LED 36.

Algorithm processor 38 receives the mode select signal from memory element 31 and performs in the operating mode specified by the control bit 31a and 31b values encoded in the mode select signal. In a preferred embodiment, algorithm processor 38 performs each of the operating states by executing one or more sequences of instructions. In such a processor, execution of instructions for an operating mode can commence at an entry point in the instruction sequence selected according to the control bit values in the mode select signal. Output path 41 represents what may be several individual control signals from algorithm processor 38 and which affect operation of the burner or other controlled system. In the embodiment shown in FIG. 1, the delay introduced by delay element 35 assures that processor 38 does not begin operation until any changed value of control bit 31b is available on path 34 at the time execution of an operating mode begins.

It is very useful if the operator receives some sort of visual confirmation or other humanly detectable indication of the operating mode which has been newly selected. Most burner controllers and many other types of controllers as well include some sort of status LED 36 which indicates at least that power is present at the power terminals. Status LED 36 can be used to provide a visual confirmation of operating mode. A mode indicator 33 provides power voltage to LED 36 which produces visible light while power voltage is present. LED 36 is connected between an output terminal of mode indicator 33 and ground terminal 19. Mode indicator 33 receives the mode select signal from memory element 31 on data path 34, and as an enable signal, the delayed output of one-shot 20 on path 37. Each time the delayed second timer signal on path 37 changes from logical 0 to logical 1, mode indicator 33 provides to LED 36 power pulses having a pattern dependent on the values encoded in the data signal on path 34 from memory 31. LED 36 flashes in the pattern corresponding to these power pulses. The power pulse pattern can have any of several convenient formats. For example, the power pulses from mode indicator 33 to LED 36 can cause LED 36 to first flash once or twice to indicate that control bit 31a is respectively a logical 0 or 1, pause a relatively long period of time, say 5 sec., and then flash once or twice to similarly indicate the value of control bit 31b. Or the two control bits 31a and 31b can be treated as a two binary bit register which may have values from 0 to 3, and mode indicator 33 can cause LED 36 to flash from 1 to 4 times to represent the values from 0 to 3 respectively. After the values recorded in control bits 31a and 31b have been signaled in this way, then the status signal on path 44 from algorithm processor 38 shown as a further input to mode indicator 33 may cause LED 36 in normal conditions to stay constantly lit, or to flash repeatedly if a lockout occurs.

The reset signal from switch 25 is also supplied to processor 38. It is important for processor 38 to accept normal reset commands from switch 25. Normally, the reset signal causes processor 38 to execute the start-up instructions which transition the processor 38 from lockout mode to normal mode. We prefer for processor 38 to not interpret a signal from switch 25 as a reset signal until a few, say 2 or 3, seconds after the timer pulse 101 from one-shot 20 occurs. Processor 38 should not execute the instructions associated with reset when control bits are changed during start-up. One reason for this is that reset may provide a substantial time delay, for example for purging any atomized fuel which may have accumulated in the burner, before allowing another attempt to ignite the burner. This time delay might require the service technician to wait unnecessarily. Secondly, if the technician does not understand the operation during this delay, it will be easy to conclude that the controller is not operating properly, which may result in unnecessary service procedures such as replacing the controller unit.

As mentioned above, this process could theoretically be extended to allow for altering more than the two bits 31a and 31b. If there are several bits to be altered using this process, then LED 36 could be briefly flashed to indicate the start of each of a number of say, 5 sec. intervals following the power change pulse 91. If switch 25 is closed briefly during any of these intervals, then a corresponding bit of memory 31 is changed. So the procedure would be to wait for each flash, which would then give the operator 5 sec. to press switch 25. It will be easy for an operator to keep track of as many as half a dozen of these flashes, and press or not press switch 25 within each of these intervals defined by its starting flash. With six control bit values 64 different operating modes will be possible. Such a scheme is simple to implement in the software of microcontroller 30.

As mentioned earlier, the functions of each of these individual logic elements are replicated in the software executed by microcontroller 30. The invention has been presented in terms of the hardware equivalents for its components for a number of reasons. The first was already mentioned, which is that it allows the public to most easily understand and practice the invention. Secondly, this emphasizes the equivalence of software and hardware versions. And lastly, this approach will lead to an expansive interpretation of the structures and structure types which the claims following define.

The preceding describes one preferred version of our invention, and describes the invention so as to allow one of skill in the art to practice it and to derive a number of variations of it, all of which we desire to protect by letters patent according to the following claims:

What is claimed is:

1. An electrically powered controller for providing a control signal having a plurality of levels, for controlling a system, said controller for performing in at least first and second distinct operating modes, and providing the control signal with levels at least in part depending on the operating mode, said controller assuming a particular operating mode responsive to the value of a mode select signal having at least first and second unique values respectively associated with the first and second operating modes, and said controller having a power terminal to which electrical power voltage may be applied responsive to a manual activity, said controller further including a) a manually operable switch providing a switch signal upon manual switch operation;

b) a power sensor receiving the power voltage and providing a power change signal responsive to a predetermined change in power voltage level;

c) a status resolver receiving the power change signal and the switch signal, and responsive to a predetermined relationship between the switch signal and the power change signal, providing a first state setting signal; and d) a first memory element receiving the first state setting signal, said first memory element having at least first and second distinct states and providing the mode select signal with a value representative of the current first memory element state, said first memory element changing state responsive to the first state setting signal from the status resolver.

2. The controller of claim 1, wherein the status resolver comprises an element providing the first state setting signal responsive to a predetermined time relationship between the switch signal and the power change signal.

3. The controller of claim 2 wherein the status resolver comprises an element providing the first state setting signal responsive to a time coincidence between the switch signal and the power change signal.

4. The controller of claim 1, including a delay element providing a timer signal a predetermined time following the power change signal, and wherein the status resolver comprises an element providing the first state setting signal dependent on the value encoded in the switch signal during the timer signal.

5. The controller of claim 1, said controller capable of assuming at least three distinct operating modes responsive respectively to at least three unique values of the mode select signal, said controller including a) a delay element providing a timer signal at a predetermined time following the power change signal; and b) a second memory element receiving a second state setting signal, said second memory element having at least first and second distinct states and providing third and fourth values of the mode select signal dependent on the current second memory element state, said second memory element changing state responsive to a second state setting signal from the status resolver;

wherein the status resolver comprises an element providing the second state setting signal dependent on the value encoded in the switch signal during the timer signal.

6. The controller of claim 1 further comprising a) an indicator element providing a humanly detectable indication of a preselected pattern dependent on the value encoded in an indicator signal; and b) a mode indicator receiving the mode select signal, and responsive thereto, providing an indicator signal to the indicator element encoding the value encoded in the mode select signal.

7. The controller of claim 6, wherein the indicator element comprises a light source generating visible light while receiving operating power at a power terminal, and wherein the mode indicator provides an indicator signal comprising a time modulated pattern of operating power to the light source's power terminal, said pattern indicating the value encoded in the mode select signal.

8. The controller of claim 7, wherein the mode indicator provides an indicator signal having at least three distinct time modulated patterns.

9. The controller of claim 1, including an algorithm processor receiving the mode select signal, said algorithm processor for executing at least first and second distinct algorithms respectively corresponding to the first and second operating modes and further respectively associated with the first and second memory states encoded in the mode select signal, and executing the one of the first and second algorithms associated with the present value in the mode select signal.

10. The controller of claim 9, wherein the algorithm processor includes a plurality of instructions comprising the first and second algorithms, and wherein the algorithm processor commences instruction execution with an instruction selected according to the value encoded in the mode select signal.

11. The controller of claim 10, including an enable element providing an enable signal responsive to the power change signal, and wherein the algorithm processor receives the enable signal and conditions instruction execution thereon.

12. The controller of claim 1, wherein the power sensor includes a) a level detector receiving the power voltage and providing a logic level output signal, said logic level having a predetermined change responsive to a predetermined change in power voltage level, and b) a one-shot receiving the level detector signal, and responsive to the predetermined change therein, providing the power change signal.

13. The controller of claim 12, wherein the status resolver comprises a first logic gate receiving the power change signal and the switch signal and providing the first state setting signal responsive to the coincidence of the power change signal and the switch signal.

14. The controller of claim 13, including a delay element receiving the power change signal and providing a timer signal comprising a level change following the level change in the power change signal by a predetermined interval;

wherein the status resolver comprises a second logic gate receiving the timer signal and the switch signal and providing a second state setting signal responsive to the coincidence of the timer signal and the switch signal; and wherein the first memory element comprises first and second control bits each having first and second memory states, said first memory element receiving the first and second state setting signals, and altering the memory states of the first and second control bits responsive to the first and second state setting signals respectively.

15. The controller of claim 12, wherein the level detector further comprises a voltage crossing detector providing the level detector signal responsive to the power voltage crossing a preselected run value in a preselected direction.

* * * * *